United States Patent [19]

Nishi et al.

[11] Patent Number: 4,638,501
[45] Date of Patent: Jan. 20, 1987

[54] FRONT PLATE OF X-RAY FILM CASSETTE

[75] Inventors: Yoshitsugu Nishi; Yukitaka Daigo, both of Saitama, Japan

[73] Assignee: Somar Corporation, Tokyo, Japan

[21] Appl. No.: 660,037

[22] Filed: Oct. 12, 1984

[30] Foreign Application Priority Data

Oct. 14, 1983 [JP] Japan .............................. 58-158039[U]

[51] Int. Cl.$^4$ .............................................. G03B 42/04
[52] U.S. Cl. ..................................... 378/182; 378/185
[58] Field of Search ............... 378/182, 183, 184, 185, 378/186, 187, 188

[56] References Cited

U.S. PATENT DOCUMENTS 4,157,474 6/1979 Koontz et al. ...................... 378/187

FOREIGN PATENT DOCUMENTS 51-121467 3/1976 Japan .

Primary Examiner—Craig E. Church
Assistant Examiner—David P. Porta
Attorney, Agent, or Firm—Finnegan, Henderson, Farabow, Garrett & Dunner

[57] ABSTRACT

A front plate of an X-ray film cassette comprising an intermediate layer made of carbon fiber reinforced plastic, and outer layers made of aromatic polyamide fiber reinforced plastic for covering both surfaces of the intermediate layer, wherein the intermediate layer and the outer layers are formed in an integrally laminated body.

10 Claims, 2 Drawing Figures

FRONT PLATE OF X-RAY FILM CASSETTE

BACKGROUND OF THE INVENTION

The present invention relates to an X-ray film cassette used for an X-ray photographic apparatus of such as medical usage, particularly to a front plate of the X-ray film cassette. The front plate means the plate of the X-ray film cassette opposed to an X-ray source.

An X-ray film cassette is generally composed of a front plate opposed to the X-ray source, a frame mounted on the periphery of the front plate, and a back plate mounted on the periphery of the frame, thereby to form a housing for receiving the X-ray films therein.

Hitherto, an aluminum plate or Bakelite plate has generally been used as a front plate of the X-ray film cassette for the reason that the aluminum plate or the Bakelite plate has a good x-ray transmissivity, a good transportation facility due to light weight and a good characteristic due to homogeneity of material. However, it has recently been proposed to utilize for the front plate of the X-ray film cassette, a plate having a X-ray transparent material layer, such as plywood and a laminated thermosetting resin plate including cotton sandwiched between carbon fiber reinforced plastic layers, and adhered to the carbon fiber reinforced plastic layers to form an integrally laminated body. Such a plate is disclosed in Japanese Utility Model Application Laid-Open No. 121,467/76.

The above mentioned front plate has a good transportation facility due to light weight in comparison with the conventional front plate, and further has a good flexural strength and modulus for bending. therefore the above mentioned proposed front plate has an advantage that the front plate is substantially unaffected by the stress generated in retaining a film and a sensitized paper in close contact with each other in the film cassette.

However, it is usual to transport a plurality of the X-ray film cassettes, and the X-ray film cassettes are sometimes drapped during the transporation, a collecting operation or a stacking operation, whereby the front plate of the cassette can be struck by the corner of other cassette. A conventional front plate of the X-ray film cassette can develop surface cracks as a result of such imports. The cracks thus produced appear on an X-ray photographic image thereby reducing the image quality of the X-ray photography. Therefore, a front plate of an X-ray film cassette not susceptible such cracks would be highly useful.

SUMMARY OF THE INVENTION

The object of the present invention is to provide a front plate of an X-ray film cassette not only having good transparency X-ray, a good transportation facility due to light weight and good structural characteristic due to homogeneity of material, but also having the desired characteristic for being resistant to cracking by impact loading.

To achive the above-noted object, the present invention has the structural feature that a front plate of an X-ray film cassette is formed in an integrally laminated body composed of a carbon fiber reinforced plastic layer, hereinafter referred to simply as a CFRP layer, which is sandwiched between aromatic polyamide fiber reinforced plastic layers, hereinafter referred to simply as AFRP layers, wherein the AFRP layers serve to prevent cracks from occurring on the surface of the front plate, and the CFRP layer serves to block the light.

DESCRIPTION OF THE PREFERRED EMBODIMENTS

Figure 1:
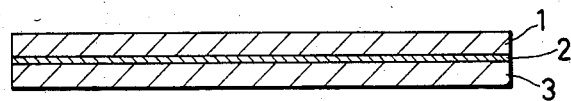
FIG. 1 is an enlarged sectional view of a front plate of an X-ray film cassette as a first embodiment of the present invention.

FIG. 1 shows an embodiment of the present invention. The front plate shown in FIG. 1 is formed in an integrally laminated body composed of a CFRP layer 2 used as an intermediate layer, the front and back surfaces of which (relative to the position of the X-ray source) are covered with AFRP layers 1 and 3, respectively.

Figure 2:
FIG. 2 is an enlarged sectional view of a front plate of an X-ray film cassette as a second embodiment of the present invention.

FIG. 2 shows another embodiment of the present invention. In FIG. 2, a bent CFRP layer 2' is located as an intermediate layer between front and back layers 1' and 3' made of the AFRP. As is apparent from FIG. 2, the thickness of the front layer 1' is set to be thicker than that of the back layer 3', and the front and back layers 1' and 3' as well the intermediate layer 2' are integrally formed in a laminated body similar to the first embodiment shown in FIG. 1.

To construct each AFRP layer of the above-mentioned front plate, there is preferably provided a plurality of resin-impregnated sheets, each having a thickness of 0.05–0.2 mm normally, of an aromatic polyamide fiber reinforced plastic material, such as uni-directional oriented aromatic polyamide fiber sheet or a cross sheet of aromatic polyamide fiber, impregnated with thermosetting resin, such as epoxy resin, unsaturated polyester resins or phenolic resins.

As a typical example for the aromatic polyamide fiber, poly-p-phenyleneterephthalamide fiber is preferable. Such fiber is commercially available as "Kevlar Fiber" manufactured by E. I. Dupont de Nemours, Co.

The amount of impregnated resins is normally about 30–45 percent of the weight of the fiber sheet. The number of sheets impregnated with resins is adjustable in accordance with the desired thickness of the AFRP layers. In the case of using the uni-directional oriented sheet impregnated with resins to laminate a plurality of the uni-directional oriented sheets, it is preferable to laminate each of the uni-directional oriented sheets in such a manner that the oriented direction of each sheet is different, for example perpendicular to the oriented direction of the adjacent sheet. In view of the stability of the size and the prevention of torsion of the laminated material after being pressed and formed, it is most preferable to use the fiber cross sheet impregnated with resins.

The thickness of the front facing outer layer, i.e., AFRP layer 1, which is opposed to the X-ray source as well as the thickness of the back facing outer layer, i.e., AFRP layer 3, which is distant to the X-ray source, are about 0.5–3 mm, preferably 1–3 mm. If the thickness is excessively small, the flexural strength and the bending flexural modulus of the manufactured front plate become insufficient. On the other hand, if the thickness is excessively large, the X-ray transmissivity is undesirably decreased.

The thickness of the back outer layer is normally selected to be substantially equal to that of the front outer layer. In this case, the front plate in which the section of the front plate is in the form of a straight line, as shown in FIG. 1, can be manufactured with stability by using a heat-pressure applied formation method. In the case where the bent formation of the front plate is effected as shown in FIG. 2 (namely, the back outer layer 3' is formed in a convex formation), it is desirable for the heat-pressure applied formation method to set the thickness of back outer layer 3' to be smaller than that of the front outer layer 1'.

The CFRP layer 2 (or 2' in the FIG. 2 embodiment) of the front plate of the present invention used as an intermediate layer includes a sheet having a thickness of 0.05–0.2 mm normally, of a material impregnated with resin. The sheet material is a carbon fiber sheet, such as uni-directional oriented carbon fiber sheet or a carbon fiber cross sheet, impregnated with the thermosetting resins.

The aount of impregnated resin is similar to that of the AFRP layers as mentioned above. The uni-directional carbon oriented fiber sheet has a very small intra-fiber gap in comparison with the carbon fiber cross sheet, so that it has a better light blocking characteristic compared to the carbon fiber cross sheet.

To maintain a suitable light blocking characteristic, it is preferred to select the thickness of the uni-directional oriented fiber sheet to be 0.05 mm or more. On the other hand, it is preferable to select the thickness of the carbon fiber cross sheet to be 0.3 mm or more. The upper limit of the thickness is about 2.5–3 mm though there is a slight difference in the value of the upper limit between the uni-directional oriented fiber sheet and the carbon fiber cross sheet. The lower limit of the thickness of the entire intermediate layer is about 0.4 mm, in view of not only maintaining the light-blocking characteristic but also the necessity of providing a suitable flextural modulus for a front plate of the X-ray film cassette.

In the above-mentioned embodiments, a single intermediate layer is shown in FIGS. 1 and 2. However, it is possible to form the intermediate layer as a sandwich lamination composed of a plurality of layers, including at least one layer of the CFRP, and plural layers of the fiber reinforced plastic, such as the AFRP.

To manufacture the front plate of the present invention, the previously manufactured AFRP layers and the CFRP layer are first laminated in a predetermined positioned relationship as defined by the present invention. Then they are integrally formed by using means for integrally forming the layers. The heat-pressure applied formation method may be normally used as the means for integrally forming the layers. For adhesion between layers, heat adhesion or an adhesive may be utilizable.

The aromatic polyamide fiber composing the AFRP layer of the front plate of the present invention is changed in color by being exposed to ultraviolet rays for a long time, so that it is preferable to provide the surface of the AFRP layers with a film, a sheet or a paint which does not reduce the transparency of X-ray and have a good performance for resisting the formation of cracks and the ultraviolet rays.

In the use of the above-mentioned front plate of the present invention, the following advantages are obtained.

(1) The front plate has increase resistance to cracks which may be formed on the surface of the front plate when an external force is applied to the surface of the front plate, for example when the corner of another cassette collides with the surface of the front plate, in comparison with the front plate of the conventional cassette. Therefore, it is not necessary to frequently replace the front plate.

(2) The aromatic polyamide fiber reinforced plastic having a light specific gravity of about 1.4 is utilized to a greater extent than the carbon fiber reinforced plastic having a heavy specific gravity of about 1.8. Therefore, the front plate of the present invention is lighter in weight than the front plate of a conventional X-ray film cassette.

The ability of the front plates of the present invention to withstand to the generation of cracks was determined in the following manner.

The front plate was supported only at both ends thereof by using a suitable supporter to position the front-facing outer layer of the front plate as the upmost surface thereof. Then, a steel ball having a diameter of 21 mm was pressed on the surface of the front-facing outer layer of the front plate until a recess of 1.1 mm due to the steel ball was produced in the surface of the front plate. Five minutes after releasing the external force due to the steel ball, the status of the surface of the front-facing outer layer was observed. The depth of the recess remaining on the surface was measured to determine whether any reduction had occurred. The ability to withstand the formation of cracks was judged as "good" in the case where no crack was produced on the front plate and where the depth of the remaining recess was small. On the other hand, an insufficient ability to withdtand the formation of cracks was reported in the case where a deep crack was produced on the surface of the front plate and where the depth of the remaining recess was large.

The X-ray transmissivity performance was determined of a front plate judged to have an insufficient ability to withstand the formation of cracks as a result of the generation of deep cracks on the surface of the front plate of the X-ray film cassette. It was found by the examination that the X-ray film within the film cassette recorded a noise image at the position on the film exactly corresponding to the location of the crack on the front plate.

Further, an operation performance in a dark room was examined in such a manner that it was judged as a good one when the brightness of the surface of the front plate would enable a person to recognize the location of the front plate in the dark room. On the other hand the operational performance, was judged as insufficient when the brightness of the surface would not enable someone to recognize the location thereof.

Referring now to examples of the front plate of the present invention, the AFRP layers used as a typical outer layer of the front plate were fabricated as follows. First, a poly-p-phenyleneterephthalamide (a kind of aromatic polyamide with the appearance of light yellow color) fiber cross sheet with a surface density of 75 g/m$^2$ was impregnated with epoxy resin of 43% by weight to form an aromatic polyamide fiber cross reinforced epoxy resin prepreg. Additional sheets to form a total of eight sheets of the AFRP prepreg were similarly fabricated. Then four of the eight sheets were integrally laminated to form a layer with the combined thickness of 0.5 mm to obtain each of the two AFRP layers of the front plate.

Next, the CFRP layer used as the intermediate layer of the front plate was fabricated as follows. First, a uni-directional oriented carbon fiber sheet having 6000 filaments were impregnated with epoxy resin, the amount of which is 38% by weight, to form the carbon fiber reinforced epoxy resin prepreg with the surface density of 150 g/m². Additional sheets to form a total of four sheets of the CFRP prepreg were similarly fabricated. Then the four CFRP prepreg sheets were integrally laminated to form a layer with the combined thickness of 0.5 mm, in such a manner that the oriented direction of each CFRP prepreg sheet was shifted by 90° with each other, i.e., 90°-0°-0°-90°, to fabricate the intermediate CFRP layer of the front plate.

Then the intermediate layer of the CFRP layer was sandwiched between the outer layers of the AFRP layers, and sandwich was pressed and heated at a temperature of 130° C. to obtain the front plate as shown in FIG. 1, which has a dimension of 362×441×1.5 mm.

The characteristics of the front plate of the present invention are shown in Table I in comparison with an example using the same layer materials but in a different order.

TABLE 1

|  |  | Example of the Present Invention | Example to be Compared |
|---|---|---|---|
| Composition of Front Plate | Front Outer Layer Material | AFRP | CFRP |
|  | Intermediate Layer Material | CFRP | AFRP |
|  | Back Outer Layer Material | AFRP | CFRP |
| Characteristics | Color of the Front Outer Layer | Light yellow | Black |
|  | Operation Performance in Dark Room | Good | Not Good |
|  | Withstanding Performance for Cracks | Good | Not Good |
|  | Weight (g) | 340 | 356 |

In the Example to be compared, the AFRP layer fabricated in the same manner as the Example of the Present Invention was utilized as an intermediate layer, as is apparent from the above Table 1. The CFRP layer fabricated in the same manner as the Example of the present invention was used as outer layers in the Example to be Compared. Both of the outer layers and the intermediate layer were integrally formed by the same heat-pressure applied formation method used to form the above-mentioned Example of the Present Invention, thereby obtaining the front plate with the same dimension of 362×441×1.5 mm, as shown in Table 1.

Although the present invention has been described in its preferred form with a certain degree of particularity, it is understood that the present disclosure of the preferred form can be changed in the details of construction, and the combination and arrangement of parts may be modified, except as may be precluded by the claims, without departing from the spirit and the scope of the present invention as hereinafter claimed.

What is claimed is:

1. A front plate of an X-ray film cassette, comprising: a multi-layer laminated body having
   (i) an intermediate layer made of carbon fiber reinforced plastic; and
   (ii) outer layers made of aromatic polyamide fiber reinforced plastic for covering both surfaces of said intermediate layer, wherein said intermediate layer and said outer layers are formed in an integrally laminated body.

2. The front plate of an X-ray film cassette set forth in claim 1, wherein said intermediate layer is composed of a plurality of sheets including at least one sheet made of said carbon fiber reinforced plastic and other sheets made of said aromatic polyamide fiber reinforced plastic.

3. The front plate of an X-ray film cassette set forth in claim 1, wherein the thickness of the front outer layer of said outer layers is substantially equal to that of the back outer layer of said outer layers.

4. The front plate of an X-ray film cassette set forth in claim 1, wherein said front plate is fabricated in a convex shape and the thickness of the front outer layer of said outer layers is larger than that of the back outer layer of said outer layers.

5. The front plate of an X-ray film cassette set forth in claim 1, wherein the thickness of said intermediate layer is about 0.4–3 mm, and the thickness of each of said outer layers is about 0.5–3 mm.

6. The front plate of an X-ray film cassette set forth in claim 1, wherein the front-facing one of said outer layers, relative to the position of an X-ray source, also comprises the outer impact-protection layer of the film cassette front plate.

7. The front plate of an X-ray film cassette set forth in claim 1, wherein each of said outer layers is composed of fiber cross sheets impregnated with resin.

8. The front plate of an X-ray film cassette set forth in claim 1, wherein said intermediate layer is composed of uni-directional oriented carbon fiber sheets impregnated with resin.

9. The front plate of an X-ray film cassette as set forth in claim 8, wherein said uni-directional oriented carbon fiber sheets are laminated to provide the oriented direction of each of said sheets to be different from that of the adjacent sheet.

10. The front plate of an X-ray film cassette set forth in claim 6, wherein said front-facing one of said outer layers is composed of fiber cross sheets impregnated with resin.

* * * * *